(12) United States Patent
Grigorian

(10) Patent No.: US 8,195,037 B2
(45) Date of Patent: Jun. 5, 2012

(54) APPARATUS AND METHOD OF STORING VIDEO DATA

(75) Inventor: Samuel Nikolay Grigorian, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 1250 days.

(21) Appl. No.: 11/982,066

(22) Filed: Oct. 31, 2007

(65) Prior Publication Data

US 2008/0063362 A1  Mar. 13, 2008

Related U.S. Application Data

(63) Continuation-in-part of application No. 10/988,229, filed on Nov. 12, 2004, now Pat. No. 7,302,159.

(51) Int. Cl.
*H04N 5/917* (2006.01)

(52) U.S. Cl. .................................................. 386/329

(58) Field of Classification Search ................... 386/329
See application file for complete search history.

(56) References Cited

U.S. PATENT DOCUMENTS

| | | | |
|---|---|---|---|
| 2002/0012521 A1* | 1/2002 | Nagasaka et al. | 386/46 |
| 2002/0158878 A1 | 10/2002 | Smirnov et al. | |
| 2006/0083488 A1* | 4/2006 | Van Gassel et al. | 386/111 |
| 2007/0204320 A1 | 8/2007 | Wu et al. | |

* cited by examiner

*Primary Examiner* — Thai Tran
*Assistant Examiner* — William Tran
(74) *Attorney, Agent, or Firm* — Gilman Clark & Hunter LLC

(57) ABSTRACT

An apparatus for and method of storing video data comprising receiving an MPEG video stream comprising I-frames and P-frames, separating the I-frames from the P-frames, storing the I-frames and the P-frames separately, and providing information so that the I-frames and the P-frames can be combined to produce a full-motion video.

15 Claims, 4 Drawing Sheets

APPARATUS AND METHOD OF STORING VIDEO DATA

CROSS-REFERENCE TO RELATED APPLICATION

This application is a continuation-in-part application of application Ser. No. 10/988,229, filed Nov. 12, 2004 now U.S. Pat. No. 7,302,159.

STATEMENT REGARDING FEDERALLY SPONSORED RESEARCH OR DEVELOPMENT

N/A

BACKGROUND OF THE INVENTION

This invention relates to surveillance systems and, in particular, to an apparatus for and method of storing video data in a video surveillance system.

Archiving the video data gathered by video surveillance systems has been a challenge because of the large amount of data involved. In many instances this data may be stored for months or even years. With MPEG compression algorithms and the increased capacity of today's disk drives, the problem has been reduced, but it is far from being solved. In multi-channel applications, the storage problem is compounded by the number of channels.

Current digital video recorders have two types of storage, namely, short-term and long-term. In most applications the short-term recordings are done with the maximum field rate to get full-motion video. All short-term available information is stored in a relatively small circular buffer. All video is stored at full-frame rate for the required period of time and then removed from the short-term buffer and put into another file for long-term storage. The file is either archived as originally recorded, which requires a large amount of long-term storage resources, or the file is processed to reduce the amount of data that is stored in archive. Processing the file before long-term storage requires that the file be reloaded and pruned in some way to provide a smaller file for archiving. This reloading and pruning process requires significant system resources and can seriously hamper the performance of the digital video recorder in recording current real time data and performing other real time operations.

SUMMARY OF THE INVENTION

In accordance with the present invention there is provided a method of storing video data comprising the steps of receiving an MPEG video stream comprising I-frames and P-frames, separating the I-frames from the P-frames, storing the I-frames and P-frames separately, and providing information so that the I-frames and P-frames can be combined to produce a full-motion video.

In accordance with the present invention there is also provided an apparatus for storing video data comprising an input for receiving an MPEG video stream comprising I-frames and P-frames, a video stream separator for separating the I-frames from the P-frames, memory for storing the I-frames and P-frames separately, and a sequence identifier for providing a unique identifier to the I-frames and P-frames so that the I-frames and P-frames can be combined to produce a full-motion video image.

In another aspect of the present invention there is provided a method of searching stored video data comprising the steps of receiving an MPEG video stream comprising I-frames and P-frames, separating the I-frames and P-frames, storing the I-frames and P-frames separately, and searching only the stored I-frames.

Another aspect of the present invention comprises an apparatus for searching stored video data comprising an input for receiving an MPEG video stream comprising I-frames and P-frames, a video stream separator for separating the I-frames and P-frames, memory for storing the I-frames and the P-frames separately, and a processor for searching only the stored I-frames.

In still another aspect of the present invention there is provided a method of providing a fast playback video comprising the steps of: receiving an MPEG video stream comprising I-frames and P-frames, separating the I-frames and P-frames; storing the I-frames and P-frames separately; and playing back only the stored I-frames in the fast playback mode.

In addition, in accordance with the present invention there is provided an apparatus for providing a fast playback video comprising an input for receiving an MPEG video stream comprising I-frames and P-frames; a video stream separator for separating the I-frames and P-frames; memory for storing the I-frames and P-frames separately; and a processor for playing back only the stored I-frames during fast playback mode.

Applicant's invention provides efficient preprocessing of the video data so that archiving of the video data is accomplished efficiently. Applicant's system provides full-motion video for the required time period and then allows easy archiving of the I-frame file by merely changing the file name, if desired, and placing it in archival storage. No reprocessing and interruption of the normal processing of the digital video recorder is required. By saving only the I-frames, The present invention eliminates up to eighty percent of the data to provide a significant savings advantage on long-term storage. Applicant's system can also utilize two circular buffers having different periods of time before data is overwritten with new data, thereby providing the possibility of full-motion video during the shorter period of time that the P-frame data is held and providing for the longer term storage of the second circular buffer containing the I-frames.

Applicant's invention also provides an efficient method to search video data and provide fast playback without burdening system resources.

In accordance with the present invention there is provided a method of storing video data comprising the steps of receiving an MPEG video stream comprising I-frames and P-frames, separating the I-frames from the P-frames, separating the I-frames into a first set of I-frames and a second set of I-frames; storing the first set of I-frames, the second set of I-frames, and the P-frames separately, and providing information so that the first set of I-frames, second set of I-frames, and the P-frames can be combined to produce a full-motion video.

In accordance with the present invention there is also provided a method of storing video data comprising the steps of receiving an MPEG video stream comprising I-frames and P-frames, separating the I-frames from the P-frames to form a set of I-frames, the set of I-frames having a first subset of I-frames and a second subset of I-frames, storing the set of I-frames, a copy of the first subset of I-frames, and the P-frames separately, and providing information so that the set of I-frames and the P-frames can be combined to produce a full-motion video.

In addition, the present invention provides an apparatus for storing video data comprising an input for receiving an MPEG video stream comprising I-frames and P-frames, a video stream separator for separating the I-frames from the P-frames to form a set of I-frames, the set of I-frames having a first subset of I-frames and a second subset of I-frames, a processor adapted to create a copy of the first subset of I-frames, memory for storing the set of I-frames, the first subset of I-frames, and the P-frames separately, and a sequence identifier for providing a unique identifier to the set of I-frames and the P-frames so that the set of I-frames and the P-frames can be combined to produce a full-motion video image.

Still further, the present invention provides an apparatus for storing video data comprising an input for receiving an MPEG video stream comprising I-frames and P-frames, a video stream separator for separating the I-frames from the P-frames to form a set of I-frames, the set of I-frames having a first subset of I-frames and a second subset of I-frames, a processor adapted to create a copy of the first subset of I-frames, memory for storing the set of I-frames, the first subset of I-frames, and the P-frames separately; and a sequence identifier for providing a unique identifier to the set of I-frames and the P-frames so that the set of I-frames and the P-frames can be combined to produce a full-motion video image.

Other advantages and applications of the present invention will be made apparent by the following detailed description of the preferred embodiment of the invention.

DETAILED DESCRIPTION OF THE INVENTION

Figure 1:
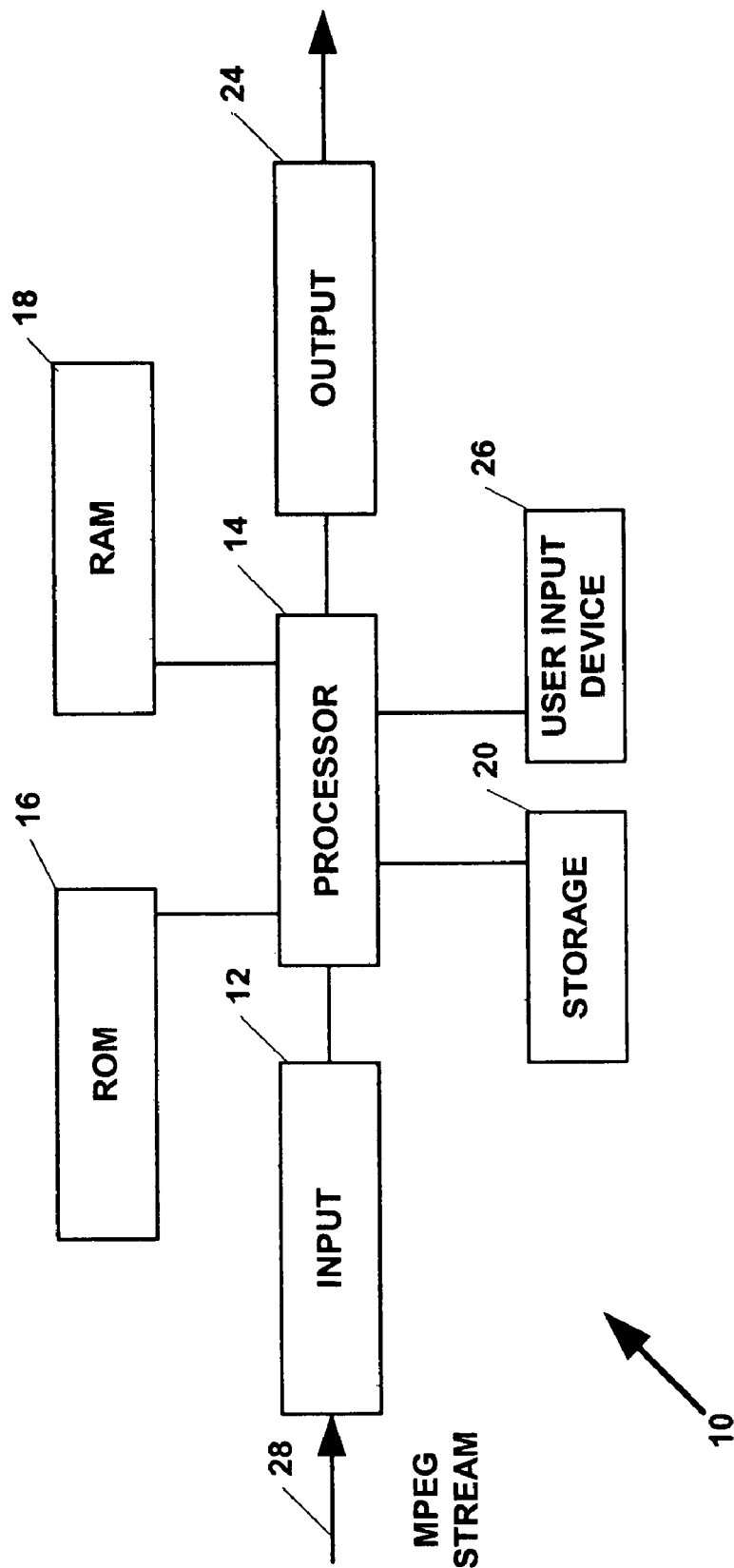
FIG. 1 is a block diagram of a digital video recorder utilizing the present invention.

Referring to FIG. 1, a digital video recorder 10 receives an MPEG video stream 28 at input 12, which provides MPEG video stream 28 to processor 14. MPEG video stream 28 can be provided via a closed network, local area network or wide area network, such as the Internet. Processor 14 is connected to ROM 16, RAM 18, and storage 20, which can be, for example, a disk drive or optical drive. Processor 14 provides output signals to output 24 for display on a monitor (not shown). Processor 14 implements algorithms and programs that are stored in ROM 16 or storage 20. User input device 26 can be a controller, keyboard, or other suitable input device connected directly to digital video recorder 10, or user input device 26 can be connected via a network, which can be a closed network, local area network or wide area network, such as the Internet. User input device 26 provides user input to processor 14, such as instructions to begin or stop recording video data, play video data, search video data, playback video data in fast playback mode, and so forth.

Figure 2:
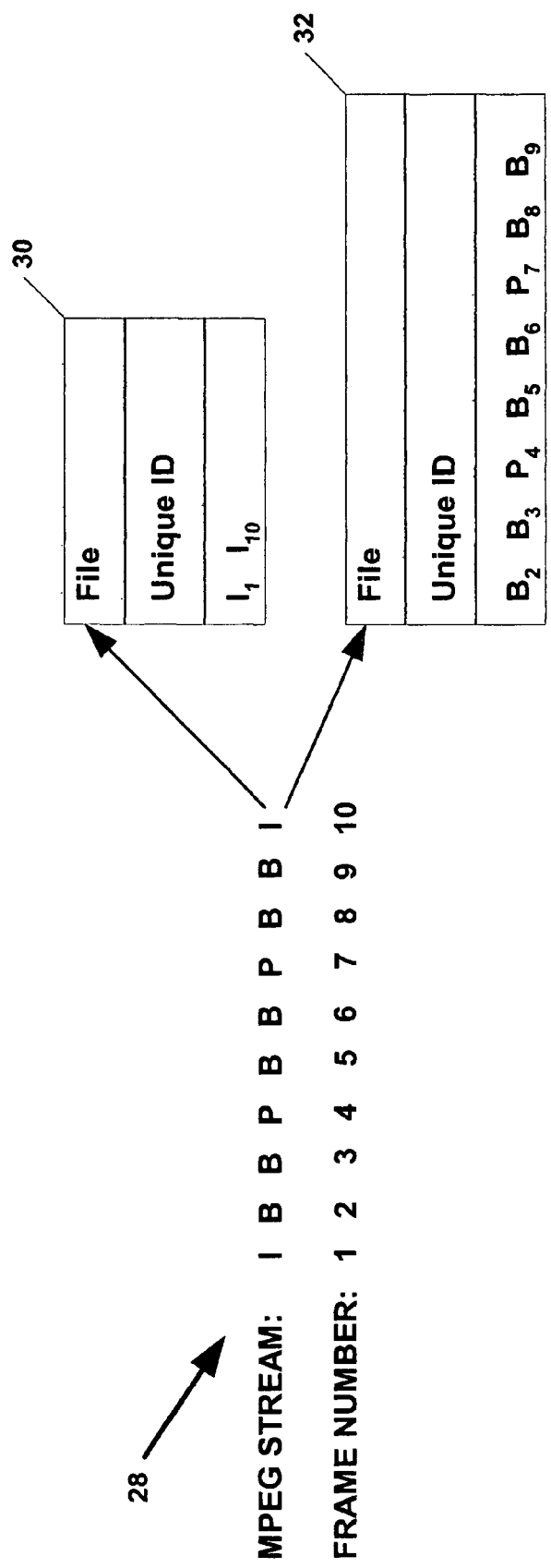
FIG. 2 is a diagrammatic block diagram illustrating the processing of an MPEG stream according to the present invention.

FIG. 2 illustrates an exemplary MPEG stream 28 that consists of a series of data frames encoding pictures. The three types of data frames are I-frames, P-frames, and B-frames. I-frames are encoded as a single image with no reference to any past or future frames. P-frames (predictive) are encoded relative to the past reference frame, which can be a P-frame or I-frame. The past reference frame is the closest preceding reference frame. B-frames (bidirectional predictive) are encoded relative to the past reference frame, the future reference frame, or both frames. The future reference frame is the closest following reference frame, either I-frame or P-frame. The series of frames, which is referred to in the art as a Group of Pictures (GOP), can take many different configurations, and, as stated above, MPEG video stream 28 is merely exemplary. The ratio of I-frames, P-frames, and B-frames is determined by the nature of the video stream and the bandwidth constraints of the network and system. In addition, the time required for encoding the video stream may also affect the ratio. MPEG video stream 28 is shown as having B-frames, although an MPEG stream consisting of only I-frames and P-frames has been found to be satisfactory for video surveillance system purposes.

With reference to FIG. 1 and FIG. 2, MPEG stream 28 is separated by processor 14 into two separate files, file 30 and file 32. Alternatively, other circuitry could be used as a video stream separator. Processor 14 determines the frame type by examining the frame headers. File 30 contains only I-frames, and file 32 contains P-frames and B-frames. As discussed above, MPEG stream 28 may not contain B-frames, and thus file 32 would contain only P-frames. Files 30 and 32 each have a unique identifier, which can be in the header of the respective files and can be a unique time stamp provided by processor 14. Processor 14 also provides each frame with a sequential frame number, (indicated as 1 through 10 in FIG. 2) so that files 30 and 32 can be combined by processor 14 to provide full-motion video in response to a request from user input device 26.

Files 30 and 32 can be stored in storage 20, which can be partitioned into short-term and long-term storage areas. The short-term and long-term storage areas can be circular buffers. The size of the two circular buffers depends on the amount of data to be stored and the length of time to keep the data before it is overwritten with new data. Alternatively, file 30 can be placed in long-term storage for archival purposes or held in an interim storage area prior to placing in long-term storage. File 32 is temporarily saved so that full-motion video can be provided by output 24 to a display for viewing for the required period of time to meet the purposes and policies of the surveillance system in which digital video recorder 10 is utilized. Processor 14 determines when the specified time has elapsed, whether it be hours, days, or longer, and then allows file 32 to be overwritten with new data. If file 32 is stored in a circular buffer, file 32 is stored there and then overwritten automatically without processor 14 monitoring the elapsed time. Similarly, file 30 can be placed in a circular and overwritten automatically. The time period between the storing of the data in the circular buffers until it is overwritten is greater for file 30 than it is for file 32. Short-term storage may be, for example, one to two weeks, and long-term storage may be, for example, six months. If desired, file 32 can be placed into long-term storage to provide full-motion video capability. File 32 can then be easily disposed of by overwriting it with other data or simply deleting if without affecting the I-frames which may be kept for archival purposes.

Digital video recorder 10 provides a savings of up to eighty percent of the space required for archival storage by storing only file 30 with the I-frames. Nevertheless, digital video recorder 10 still provides full-motion video capability during the period of time that such video may be of interest to the user. In addition, digital video recorder 10 does not require processor 14 to reload and process MPEG stream 28 before the data is archived as is required by a system that stores MPEG stream 28 as it is received by input 12.

If desired, prior to archival storage, file 30 can be processed by processor 14 so that only a portion of file 30 is placed into archival storage in storage 20. For example, a first I-frame may be stored, then one or more I-frames can be skipped and then the next I-frame is recorded. This process is repeated until all of file 30 has been processed. Processing file 30 to remove a portion of the I-frames is a relatively simple and efficient operation compared to reloading and reprocessing of the entire MPEG stream, thereby placing only a minimal demand on system resources.

If processor 14 receives a request to search the recorded video data, processor 14 executes the search using only file 30 to expedite the search and limit system resource requirements compared to a system that stores MPEG stream 28 as it is received by input 12. Similarly, if processor 14 receives a request to playback the recorded video data in fast playback mode, processor 14 provides the fast playback mode by playing only file 30. This provides a significant savings in the system resources required to display the recorded video data in fast playback mode compared to a system that stores MPEG stream 28 as it is received by input 12.

Figure 3:
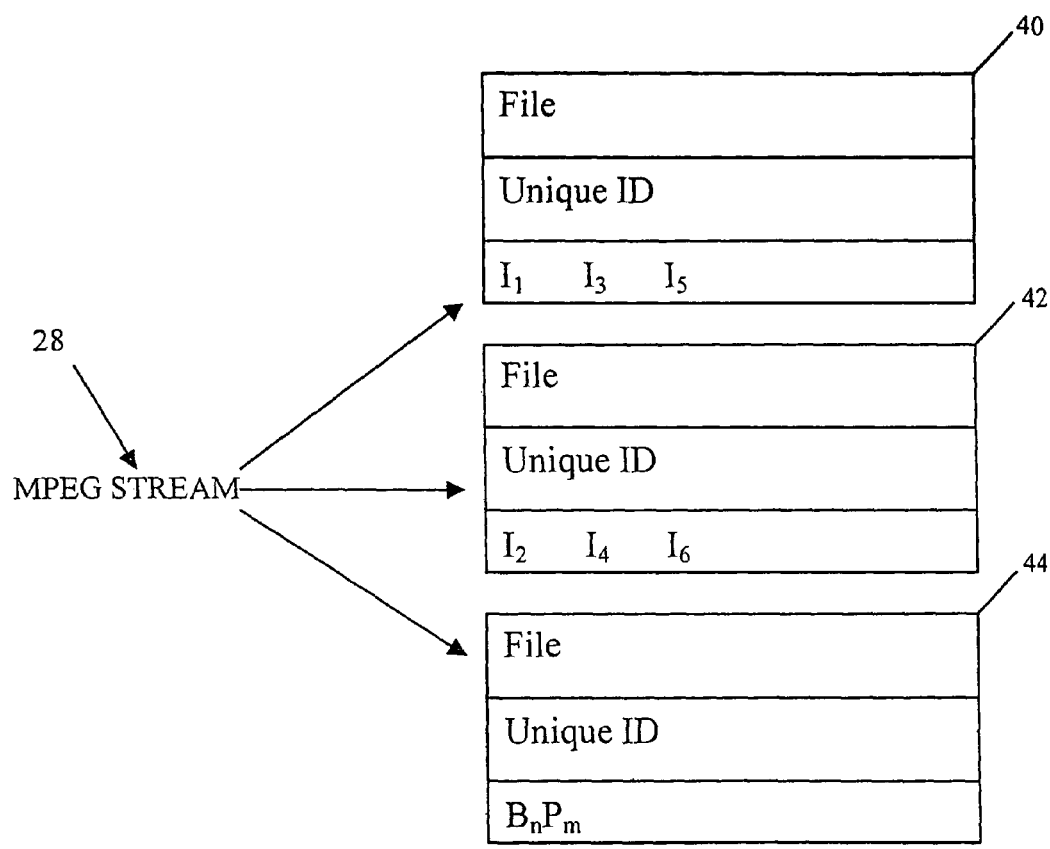
FIG. 3 is a diagrammatic block diagram illustrating the processing of an MPEG stream according to the present invention.

Referring to FIG. 1 and FIG. 3, MPEG stream 28 is separated by processor 14 into three separate files, file 40, file 42, and file 44. Alternatively, as discussed above, other circuitry could be used as a video stream separator. Processor 14 determines the frame type by examining the frame headers and splits the I-frames into two separate sets with one set stored in file 40 and the other set stored in file 42. As illustrated in FIG. 3, alternate I-frames are stored in files 40 and 42 with $I_1$, $I_3$, and $I_5$ stored in file 40 and $I_2$, $I_4$, and $I_6$ stored in file 42. Other techniques could be used, such as every third I-frame or every fourth I-frame could be stored in file 40 with the remainder of the I-frames being stored in file 42. File 44 contains P-frames and B-frames, which are illustrated as $B_n$, and $P_m$. As discussed above, MPEG stream 28 may not contain B-frames, and thus file 44 would contain only P-frames. Files 40, 42, and 44 each have a unique identifier, which can be in the header of the respective files and can be a unique time stamp provided by processor 14. Processor 14 also provides each frame with a sequential frame number (as discussed above and illustrated in FIG. 2) so that files 40, 42, and 44 can be combined by processor 14 to provide full-motion video in response to a request from user input device 26.

Files 40, 42, and 44 can be stored in storage 20, which can be partitioned into storage areas having storage terms of differing lengths. For example, each of files 40, 42, and 44 can have different lengths of storage. File 40 could have the longest term of storage, file 42 could have a shorter term than file 40, and file 44 could have the shortest term of storage. The different term storage areas can be circular buffers. The size of the three circular buffers depends on the amount of data to be stored and the length of time to keep the data before it is overwritten with new data. Alternatively, file 40 can be placed in long-term storage for archival purposes or held in an interim storage area prior to placing in long-term storage. Having the two different sets of I-frames reduces the amount of long-term storage required without requiring any reprocessing of the file. In addition, having a storage term for file 42 that is longer than the term for file 44 allows a tiered data set for a user by providing full-motion video during the time that all three files are stored and a complete set of I-frames during the time that file 42 is stored after the retention storage time of file 44 has expired. Processor 14 determines when the specified time has elapsed for each of files 40, 42, and 44, whether it be hours, days, or longer, and then allows the appropriate file to be overwritten with new data. If files 40, 42, and 44 are stored in circular buffers, then they are overwritten automatically without processor 14 monitoring the elapsed times.

Figure 4:
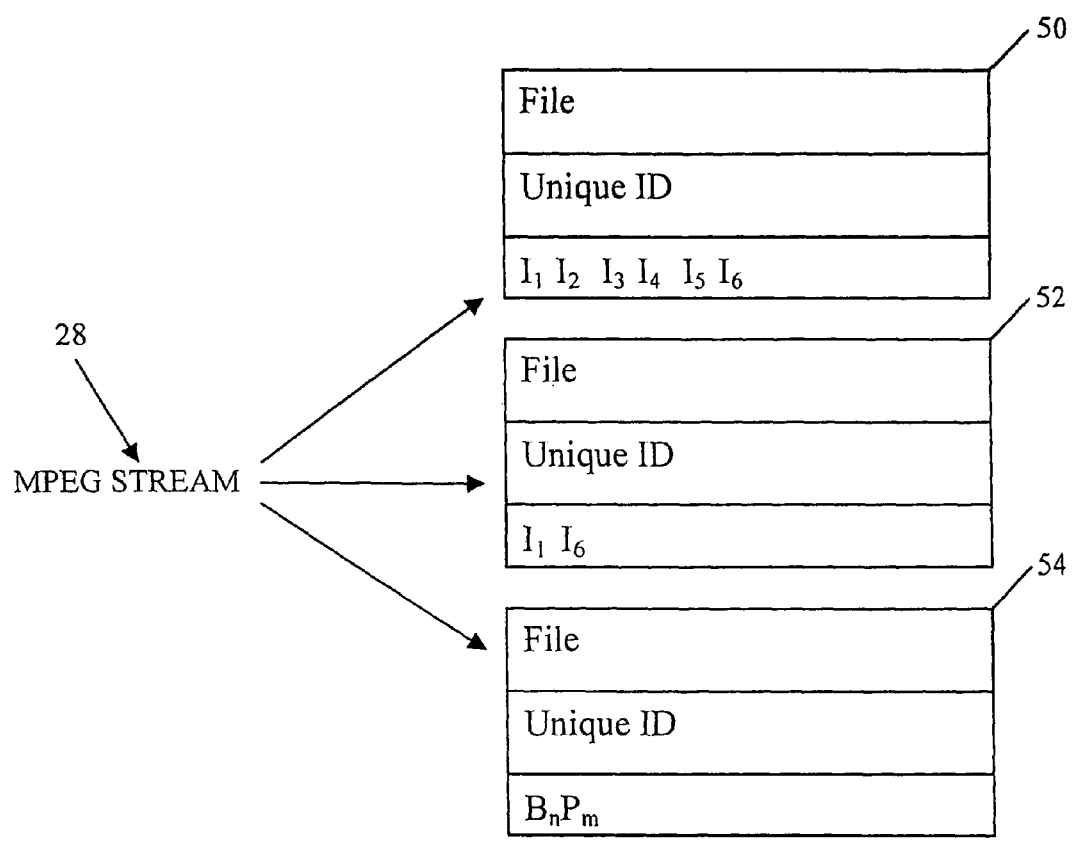
FIG. 4 is a diagrammatic block diagram illustrating the processing of an MPEG stream according to the present invention.

Referring to FIG. 1 and FIG. 4, MPEG stream 28 is separated by processor 14, as discussed above, into I-frames which are stored in file 50 and B-frames and P-frames that are stored in file 54. A subset of the I-frames stored in file 50 is also stored in file 52. As illustrated in FIG. 4, a copy of every fifth I-frame is stored in file 52, which is illustrated by $I_1$, and $I_6$. Other techniques could be used, for example, every second, third or fourth I-frame and so on could be stored in file 52. File 54 contains P-frames and B-frames, which are illustrated as $B_n$, and $P_m$. As discussed above, MPEG stream 28 may not contain B-frames, and thus file 54 would contain only P-frames. Files 50, 52, and 54 each have a unique identifier, which can be in the header of the respective files and can be a unique time stamp provided by processor 14. Processor 14 also provides each frame with a sequential frame number (as discussed above and illustrated in FIG. 2) so that files 50 and 54 can be combined by processor 14 to provide full-motion video in response to a request from user input device 26.

Files 50, 52, and 54 can be stored in storage 20, which can be partitioned into storage areas having storage terms of differing lengths. For example, each of files 50, 52, and 54 can have different lengths of storage. File 52 could have the longest term of storage, file 50 could have a shorter term than file 52, and file 54 could have the shortest term of storage. The different term storage areas can be circular buffers. The size of the three circular buffers depends on the amount of data to be stored and the length of time to keep the data before it is overwritten with new data. Alternatively, file 52 can be placed in long-term storage for archival purposes or held in an interim storage area prior to placing in long-term storage. Having the complete set of I-frames in file 50 provides efficient combining of the I-frames with the B-frames and P-frames in file 54 to provide full-motion video during the time that files 50 and 54 are retained in storage. The subset of I-frames stored in file 52 reduces the amount of storage required for long-term storage without requiring any reprocessing of the file. Processor 14 determines when the specified time has elapsed for each of files 50, 52, and 54, whether it be hours, days, or longer, and then allows the appropriate file to be overwritten with new data. If files 50, 52, and 54 are stored in circular buffers, then they are overwritten automatically without processor 14 monitoring the elapsed times.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of storing video data comprising the steps of:
    receiving an MPEG video stream comprising a series of I-frames and P-frames;
    separating the series of I-frames from the P-frames;
    separating the series of I-frames into a first set of I-frames and a second set of I-frames such that the first set of I-frames comprises I-frames that have been separated from the series of I-frames at a periodic rate;
    storing the first set of I-frames in a first circular buffer having a first period of time before information stored in the first circular buffer is overwritten with new information;

storing the second set of I-frames in a second circular buffer having a second period of time before information stored in the second circular buffer is overwritten with new information;

storing the P-frames in a third circular buffer having a third period of time before information stored in the third circular buffer is overwritten with new information wherein the first period of time is longer than the second period of time and is longer than the third period of time; and providing information so that the first set of I- frames, second set of I-frames, and the P-frames can be combined to produce a full-motion video.

2. The method as recited in claim 1, wherein said providing step comprises providing an index to correlate the first set of I-frames, the second set of I-frames, and the P-frames.

3. The method as recited in claim 1, wherein said providing step comprises giving each frame of the MPEG video stream received in said receiving step a unique identifier.

4. The method as recited in claim 1, wherein said providing step comprises giving each frame of the MPEG video stream received in said receiving step a unique time stamp and numbering the frames sequentially.

5. The method as recited in claim 1, wherein in said storing step the second period of time is longer than the third period of time.

6. A method of storing video data comprising the steps of:
receiving an MPEG video stream comprising I-frames and P-frames;
separating the I-frames from the P-frames to form a set series of I-frames, copying I-frames from the series of I-frames at a periodic rate to form a subset of I-frames;
storing the set of I-frames in a first circular buffer having a first period of time before information stored in the first circular buffer is overwritten with new information;
storing the subset of I-frames in a second circular buffer having a second period of time before information stored in the second circular buffer is overwritten with new information;
storing the P-frames in a third circular buffer having a third period of time before information stored in the third circular buffer is overwritten with new information wherein the second period of time is longer than the first period of time and is longer than the third period of time; and
providing information so that the set of I-frames and the P-frames can be combined to produce a full-motion video.

7. The method as recited in claim 6, wherein said providing step comprises providing an index to correlate the set of I-frames and the P-frames.

8. The method as recited in claim 6, wherein said providing step comprises giving each frame of the MPEG video stream received in said receiving step a unique identifier.

9. The method as recited in claim 6, wherein said providing step comprises giving each frame of the MPEG video stream received in said receiving step a unique time stamp and numbering the frames sequentially.

10. An apparatus for storing video data comprising:
an input for receiving an MPEG video stream comprising a series of I-frames and P-frames;
a video stream separator for separating said series of I-frames from said P-frames to form a first set of I-frames and a second set of I-frames such that the first set of I-frames comprises I-frames that have been separated from the series of I-frames at a periodic rate;
memory for storing said first set of I-frames, said second set of I-frames, and said P-frames separately, wherein said memory comprises a first circular buffer for storing said first set of I-frames, said first circular buffer having a first period of time before information stored in said first circular buffer is overwritten with new information, a second circular buffer for storing said second set of I-frames, said second circular buffer having a second period of time before information stored in said second circular buffer is overwritten with new information, and a third circular buffer for storing said P-frames, said third circular buffer having a third period of time before information stored in said third circular buffer is overwritten with new information wherein said first period of time is longer than said second period of time and is longer than said third period of time; and
a sequence identifier for providing a unique identifier to said set of I-frames and said P-frames so that said set first and second sets of I-frames and said P-frames can be combined to produce a full-motion video image.

11. The apparatus as recited in claim 10, wherein said sequencer identifier provides an index to correlate said I-frames and said P-frames.

12. The apparatus as recited in claim 10, wherein said sequence identifier provides a unique time stamp and numbers the frames of said MPEG video stream sequentially.

13. An apparatus for storing video data comprising:
an input for receiving an MPEG video stream comprising I-frames and P-frames;
a video stream separator for separating said I-frames from said P-frames to form a series of I-frames;
a processor adapted to copy I-frames from the series of I-frames at a periodic rate to form a subset of I-frames;
memory for storing said series of I-frames, said subset of I-frames, and said P-frames separately, wherein said memory comprises a first circular buffer for storing said series of I-frames, said first circular buffer having a first period of time before information stored in said first circular buffer is overwritten with new information, a second circular buffer for storing said subset of I-frames, said second circular buffer having a second period of time before information stored in said second circular buffer is overwritten with new information, and a third circular buffer for storing said P-frames, said third circular buffer having a third period of time before information stored in said third circular buffer is overwritten with new information wherein said second period of time is longer than said first period of time and is longer than said third period of time; and
a sequence identifier for providing a unique identifier to said series of I-frames and said P-frames so that said series of I-frames and said P-frames can be combined to produce a full-motion video image.

14. The apparatus as recited in claim 13, wherein said sequencer identifier provides an index to correlate said I-frames and said P-frames.

15. The apparatus as recited in claim 13, wherein said sequence identifier provides a unique time stamp and numbers the frames of said MPEG video stream sequentially.

* * * * *